(12) United States Patent
Burke

(10) Patent No.: US 8,539,124 B1
(45) Date of Patent: Sep. 17, 2013

(54) STORAGE INTEGRATION PLUGIN FOR VIRTUAL SERVERS

(75) Inventor: Barry A. Burke, Tyngsboro, MA (US)

(73) Assignee: EMC Corporation, Hopkinton, MA (US)

( * ) Notice: Subject to any disclaimer, the term of this patent is extended or adjusted under 35 U.S.C. 154(b) by 86 days.

(21) Appl. No.: 12/751,093

(22) Filed: Mar. 31, 2010

(51) Int. Cl.
*G06F 3/00* (2006.01)
*G06F 13/12* (2006.01)
*G06F 13/38* (2006.01)

(52) U.S. Cl.
USPC .................................. 710/74; 710/65; 710/15

(58) Field of Classification Search
USPC ................................. 710/74, 65, 15
See application file for complete search history.

(56) References Cited

U.S. PATENT DOCUMENTS

2005/0228937 A1* 10/2005 Karr et al. .......................... 711/6
2007/0299809 A1* 12/2007 Browne et al. .................... 707/1

* cited by examiner

*Primary Examiner* — Idriss N Alrobaye
*Assistant Examiner* — Zachary K Huson
(74) *Attorney, Agent, or Firm* — Krishnendu Gupta; Joseph D'Angelo

(57) ABSTRACT

A method system and program product to enable a storage device, comprising a storage device meta data device, to communicate with a host comprising a host meta data device, the method comprising inserting meta data into an I/O stream communicated between a host and a storage device and removing meta data inserted into an I/O stream communicated between a host and a storage device, wherein the meta data contains communications between the storage device and the host.

23 Claims, 15 Drawing Sheets

STORAGE INTEGRATION PLUGIN FOR VIRTUAL SERVERS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to application IT resource usage and behaviors.

BACKGROUND

Host processor systems may store and retrieve data using one or more data storage systems containing a plurality of host interface units (host adapters), disk data storage devices, and disk interface units (disk adapters), as well as a cache memory. Such data storage systems are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the data storage systems through a plurality of channels provided therewith. Host systems provide data and access control information through the channels of the data storage systems and the data storage systems provides data to the host systems also through the channels.

The host systems do not address the disk data storage devices of the data storage system directly, but rather, access what appears to the host systems as a plurality of logical volumes. These logical locations are mapped into physical locations on the disk data storage devices, but the logical volumes may be larger or smaller than the corresponding disk data storage devices, and may span multiple drives. A single logical location may also be mapped to multiple physical locations, when, for example, data mirroring is desired.

Cache memory may be used to store frequently accessed data for rapid access. Typically, it is time-consuming to read or compute data stored in the disk data storage devices. However, once data is stored in the cache memory, future use can be made by accessing the cached copy rather than reading it from the disk data storage device, so that average access time to data may be made lower.

One technique for expediting read requests involves prefetching data units so that more data units will available from cache memory rather than from disk storage. Typically, prefetching is implemented by reading data units in blocks in response to one or more requests to read a data unit. Since a request to read a specific data unit increases the likelihood that access to other, related data units will soon be required, the read request for the data unit may trigger a prefetch request to read related data units as well, particularly when a read request results in reading a data unit off-cache rather than from the cache memory.

Prefetching requires a significant number of cache-slots to be available in the cache memory. When long sequences of data units are prefetched into the cache memory, other data units typically have to be removed in the cache memory in order to make room for the newly prefetched data units.

One problem with prefetching is that the data units that are prefetched are not necessarily going to be accessed, for example by a host processor. A possibility arises that the host processor will access them because they are adjacent to a data unit that it had required, but it is not a certainty that the host processor will require the prefetched data units.

Prefetching involves retrieving data units that the host may or may not need. On the other hand, prefetching involves removing in-cache data units that still have some probability of being accessed. Therefore, prefetching raises the possibility that data units for which the host processor requires access may be replaced by data units for which the host processor does not and never will require access. It is therefore, important to remove cache data that is not likely to be still required by the data storage system. Cache Pollution is defined to be the population of the cache memory with data units that are not required for re-accessing, for example, by a host processor.

As noted before, a read request for data units that are out-of-cache will take longer to execute than a request for data units that are in-cache. Therefore, it is not preferable to retrieve the data unit e from its location off-cache if it can be read from an in-cache location. In addition, procedurally, a disk adapter will execute a read request before it completes a prefetch operation. Therefore, the disk adapter will execute the read request for the data unit e before it completes the prefetch operation in which the data unit e would have been retrieved.

SUMMARY

A method system and program product to enable a storage device, comprising a storage device meta data device, to communicate with a host comprising a host meta data device, the method comprising inserting meta data into an I/O stream communicated between a host and a storage device and removing meta data inserted into an I/O stream communicated between a host and a storage device, wherein the meta data contains communications between the storage device and the host.

DETAILED DESCRIPTION

Figure 1:
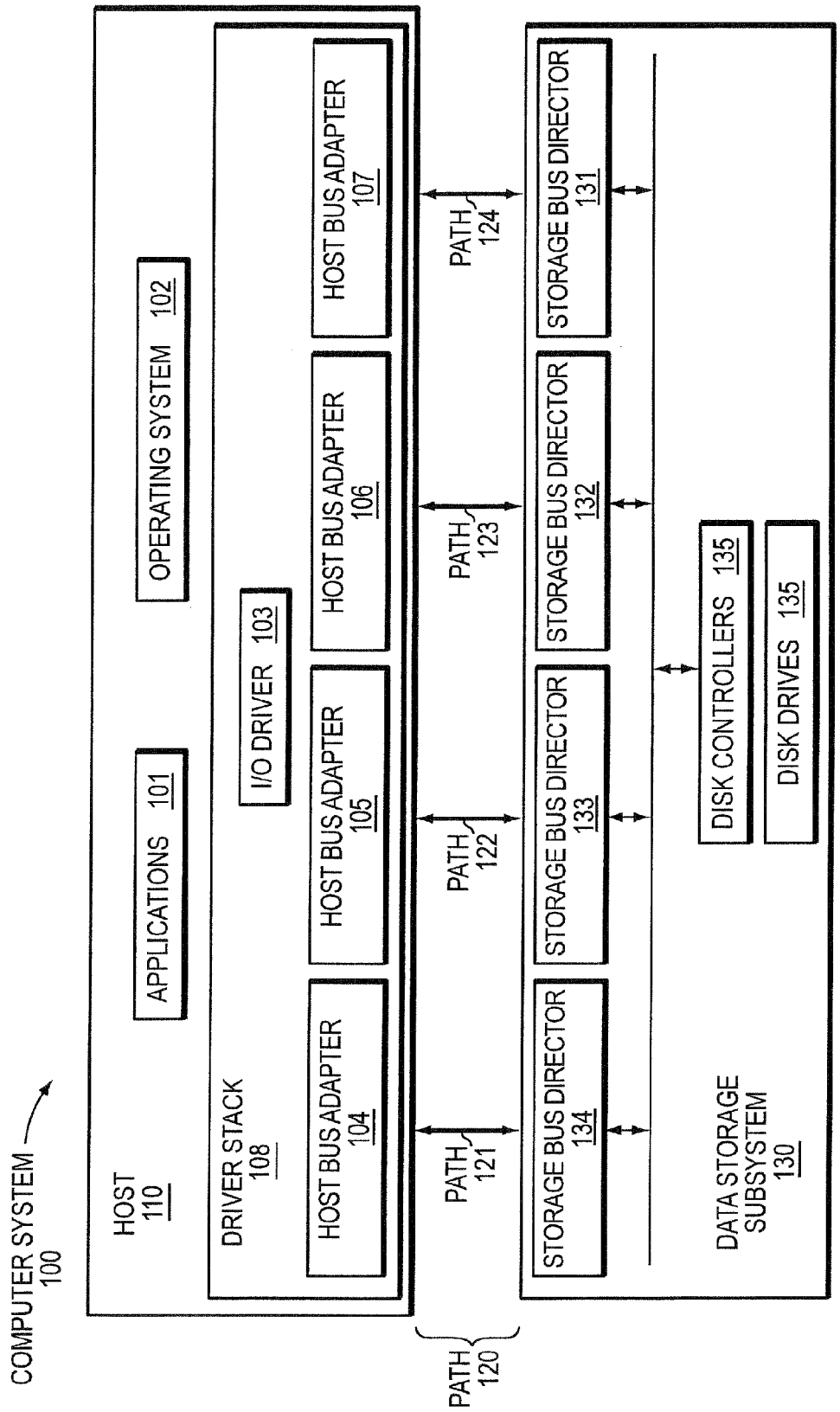
FIG. 1 shows an embodiment of a system on which the current techniques may be practiced.

Current storage media solutions are typically limited in understanding behavior of application IT resource usage and behavior. For example, the storage devices typically do not communicate directly with the application or host, rather they are typically treated as a peripheral in a service provider model responding only to targeted I/O requests; the more advanced storage devices may at best employ heuristics in an attempt to predict what information will be requested via prediction algorithms.

However, application focused solutions could benefit from application-specific behavioral knowledge or purpose/intent awareness at the storage resource. In an embodiment, the current invention provides the ability to understand application resource usage behavior, in part, by enabling communication between applications and the application storage device. In some embodiments, the communication between the storage and the application may be bi-directional, enabling a conversation between host and storage or it may be unidirectional, simply relaying information from I/O requestor to the storage media or vice-versa.

In an embodiment, a host resident (kernel) module or driver may be inserted into an I/O driver stack on the host computer; this embodiment may enable the host to communicate with an external storage array to provide additional insights as to the host environment, workloads and/or resource utilization. In a further embodiment, the storage device may insert data into the I/O stream to communicate with the embodiment running on the host, either querying for host status or sending requests to the host embodiment. In alternative embodiments, metadata may be inserted into the I/O request queue sent to the external storage. In some embodiments, this communication may indicate a range of block numbers or Logical Block Addresses (LBA) on the storage that may be requested by the application in the future. In other embodiments, the host may respond to inquiry requests from the external storage array. In further embodiments, this communication may request that the storage keep a set of blocks, such as the indices of a database, in easily accessible memory such as a cache or high speed storage, or to indicate that a certain range of blocks will soon be required (or are no longer needed).

In some embodiments, this communication may be used to effect host-side operations on behalf of the storage, such as changing I/O queue depths, recognizing new SAN paths to LUNs, or passing authentication data to support per-user data encryption or access control. In other embodiments, it may enable more effective prediction of data that will be read to enable more effective pre-fetching or caching of the data. In further embodiments, the communications may be used for authentication. In another embodiment, the communication may be used for target shifting transparent to host at the application level.

In further embodiments, the storage device may have no knowledge of what data is being stored on the device, other than the logical block numbers corresponding to the data. In some embodiments, the communication between the storage device and host computer may be in logical block numbers. In other embodiments, the conversation may include the transfer of more detailed information and requests.

Driver Stack

Reference is now made to exemplary embodiments of the invention, examples of which are illustrated in the accompanying drawings. A computer system may include multiple hosts and multiple data storage subsystems, such that each host may access data on each of data storage subsystems. For simplicity, however, FIG. 1 illustrates a computer system 100 that includes a single host 110 and a single data storage subsystem 130. Applications 101 running on operating system 102 of host 110 may access data in data storage subsystem 130 via I/O driver 103 and host bus adapters 104, 105, 106, and 107. Host 110 can be, for example, a server, a personal computer, or any other device capable of initiating read and write requests to data storage subsystem 130. Data storage subsystem 130 can be a single physical data storage device or a data storage system comprising multiple physical data storage devices including an enterprise storage system. For example, data storage subsystem 130 may be a SYMMETRIX data storage system, available from EMC Corporation of Hopkinton, Mass., a CLARIION data storage system available from EMC Corp., a TagmaStore data storage system available from Hitachi Data Systems Corp. of Santa Clara, Calif., or a FAStT data storage system available from IBM. In computer systems consistent with the principles of the invention, there may be a plurality of data storage subsystems 130 accessible by host 110 and each data storage subsystem may be unique.

Host 110 has multiple paths 120 for sending I/O requests to data storage subsystem 130. Typically, there are at least two paths from a host to a data storage subsystem. Generally, there may be up to 32 paths. FIG. 1 shows four paths from host 110 to data storage subsystem 130: path 121, path 122, path 123, and path 124. Each of the paths 120 can be any of a number of different types of communication links that allow data to be passed between data storage subsystem 130 and host 110. Each of the host bus adapters 104, 105, 106, and 107 would be adapted to communicate using an appropriate protocol via the paths 120. For example, path 120 can be implemented as a SCSI bus with host bus adapters 104 and storage bus director 134 each being a SCSI driver. Alternatively, path 120 between the host 110 and the data storage subsystem 130 may be a Fibre Channel fabric. Moreover, a path 120 may include multiple communication path types and may be part of a communication network.

Host 110 contains an operating system 102, applications 101, I/O driver 103, and host bus adapters 104, 105, 106, and 107. I/O driver 103 facilitates the sending of I/O requests from applications 101 running on host 110 to data storage subsystem 130. The I/O driver may queue I/O requests from host 110 directed to data storage subsystem 130. In addition, the I/O driver may implement algorithms to decide which I/O requests to send, how many I/O requests to send, and the speed at which to send I/O requests. The I/O driver may keep a record of I/O requests that are sent to data storage subsystem 130 until the I/O request is processed by data storage subsystem 130. An exemplary host I/O driver is the POWERPATH tool, available from EMC Corp. The POWERPATH tool may use known path selection techniques such as those described in U.S. Pat. No. 6,542,944, entitled "Method And Apparatus For Balancing Workloads Among Paths In A Multi-Path Computer System Based On The State Of Previous I/O Operations" and issued on Apr. 1, 2003 to EMC Corp. As well, application Ser. No. 11/682,049 labeled "Methods And Systems For Dynamic Division of Path Capacity" provides a further description thereof. Both U.S. Pat. No. 6,542,944 and application Ser. No. 11/682,049 are hereby incorporated by reference.

Figure 2:
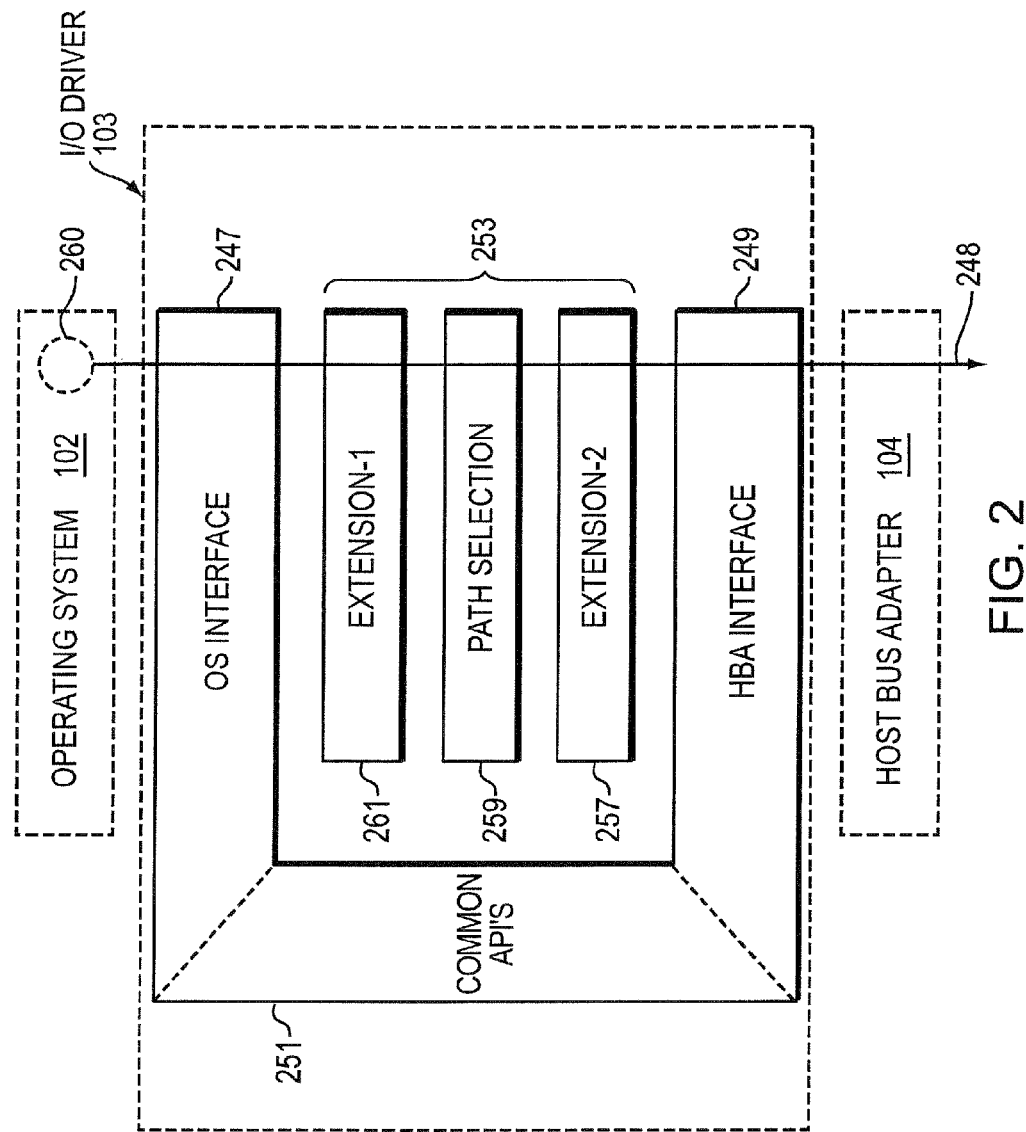
FIG. 2 illustrates portions of an exemplary host including an I/O driver, in accordance of an embodiment of the present invention.

FIG. 2 illustrates portions of an exemplary host including an I/O driver, consistent with features and principles of the present invention. Although I/O driver 103 only interacts with an operating system 102, I/O driver 103 can conceptually be considered to be placed between operating system 102 and at least one host bus adapter 104. I/O requests, such as I/O request 260, are passed from the operating system 102 to the I/O driver through the OS interface 247.

I/O driver 103 of FIG. 2 may be thought of conceptually as having the form of a "C" clamp with a top horizontal arm 247, a bottom horizontal arm 249, and a vertical connector 251 between the arms. Horizontal arm 247 may be, for example, an interface to any operating system (OS) such as LINUX, Sun's SOLARIS, IBM's AIX, HP's HPUX, and Microsoft's WINDOWS NT. Bottom horizontal arm 249 includes platform-dependent code comprising an interface to relevant host bus adapters 104, 105, 106, and 107. Only host bus adapter 104 is shown for exemplary purposes. Vertical connector 251 comprises a series of common Application Programming Interfaces (APIs). An advantage of the C clamp is that extensions can be written in a platform-independent manner because the arms 247, 249 translate all of the platform-dependent communications into more generic communications. An extension stack 253 is enveloped between arms 247 and 249. In addition to a plurality of existing extensions 261, 257 in extension stack 253, a path selection extension 259 is added to perform the logical division of path capacity. Path selection extension 259 can consist of a plurality of extensions.

The I/O driver, via path extension 259, may select a path by which to transmit an I/O request or group of I/O requests to data storage subsystem 130. I/O driver 103 would communicate with the appropriate host bus adapter 104, 105, 106, or 107 depending on which path is selected. As described, the Powerpath driver has been inserted into the drive stack to direct data.

Meta Data Insertion

According to an aspect of the invention, a new driver may be inserted into the driver stack. In some embodiments, this driver may be placed at any level of the stack. In other embodiments, the driver may be integrated into the PowerPath driver. In other embodiments, it may be higher or lower on the driver stack. In some embodiments, the driver may be transparent to the application on the host. In other embodiments, the driver may communicate directly with the application. In some embodiments, the driver may be transparent to the host.

In alternative embodiments, a driver may not be "inserted" into the host operating software. In some embodiments, it could be natively implemented within the host OS (i.e. UNIX, Windows), or in a hardware virtualization "hypervisor" such as in VMware, Microsoft Hyper-V, or Oracle Virtualization Manager. It could also be implemented at higher levels, above the operating system. For example, an embodiment might be created for SAP's application framework or for Oracle's database engines, or it may be built right into the Java Runtime, or the Common Language Runtime, or may be implemented within an application.

In some embodiments, the host driver may insert metadata into the I/O stream that is being written to or read from the data storage. In other embodiments, the driver may remove metadata that was inserted into the I/O stream at the data storage device. In further embodiments, the driver may both read communications from the storage device as well as sending communications to the storage device. In conjunction with the driver on the host, some embodiments of the current invention will enable intelligence on the storage device.

In further embodiments, the storage device may be able to intercept the metadata inserted into the I/O stream. In certain embodiments, the storage device may be aware that there is additional IO or metadata in the I/O stream. The storage device may be able to remove this additional IO or metadata from the I/O stream without disturbing the rest of the IO. The storage device may be able to use this meta data to improve data transfer to the host. As well the storage device may be able to insert additional IO or metadata into the I/O stream.

Figure 3:
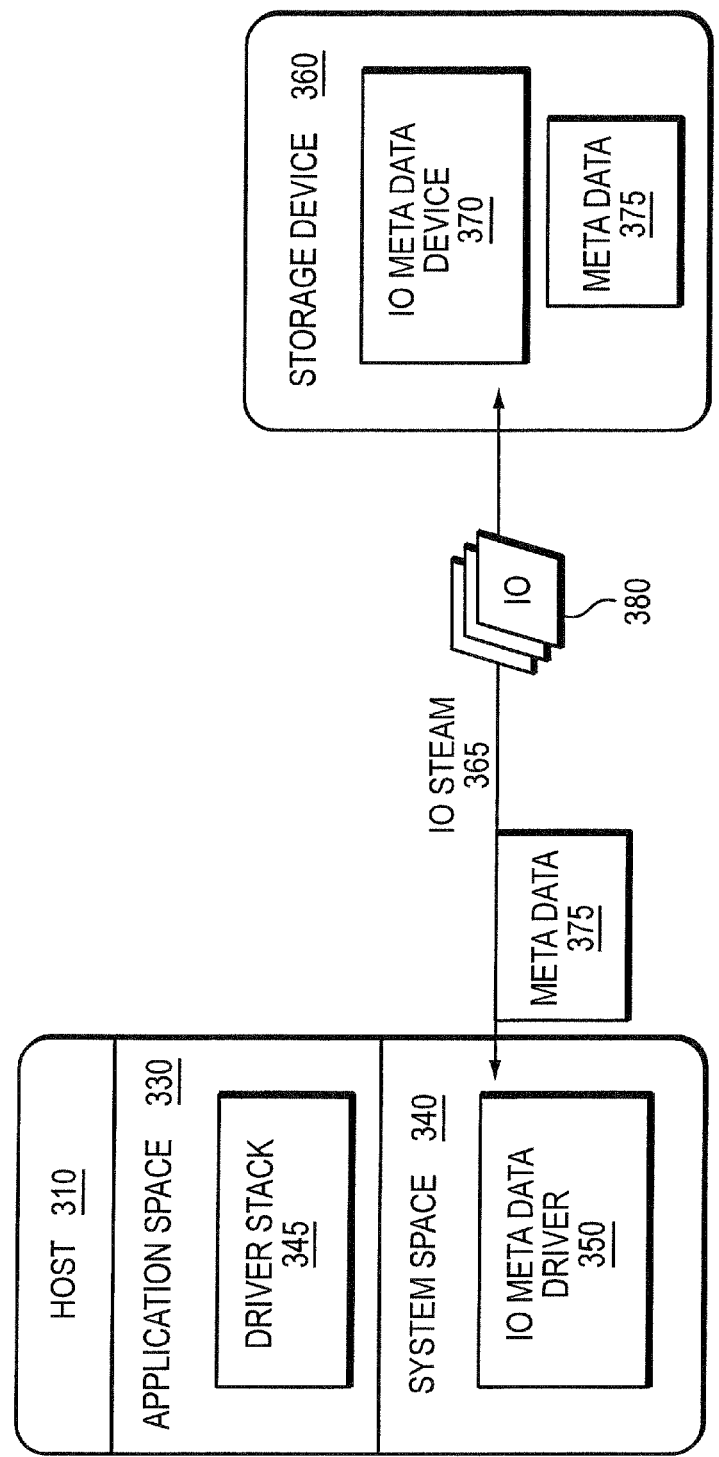
FIG. 3 illustrates portions of a host which comprises a driver stack in accordance with an embodiment of the present invention.
Figure 4A:
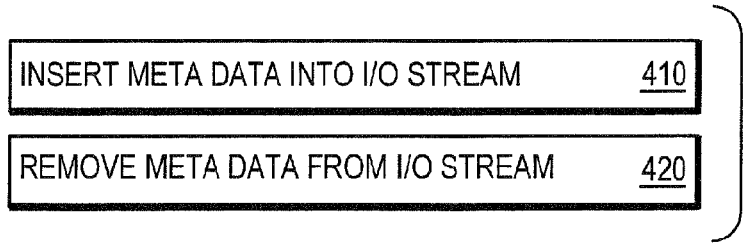
FIG. 4a illustrates an embodiment of a method of the present invention.

Refer now to the embodiments of FIGS. 3 and 4a. In FIG. 3, there is a host 310 which comprises a driver stack 345. In this embodiment, the driver stack 345 has a meta data driver 350. As well the embodiment of FIG. 3 illustrates an aware storage device 360 with an I/O meta device 370. The storage device 360 may insert 410 meta data 375 into the IO Stream 365. Note, for simplification in this embodiment and throughout the specification, the meta data being inserted and removed from the I/O stream may be referred to as the same object in the Figures. However, the actual data in the meta data may be different and may represent a way to communicate between the host and storage device. As well the storage device 370 may remove 420 meta data 375 from the I/O stream 365. Similarly, the host meta driver 350 may also remove 420 meta data 375 from the IO stream and the host meta data driver 350 may insert 410 meta data 375 into the IO stream 365.

Figure 4B:
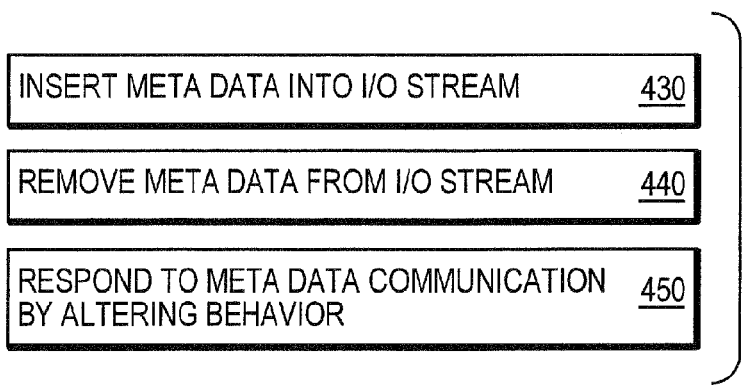
FIG. 4b illustrates an alternative embodiment of a method of the present invention.
Figure 4C:
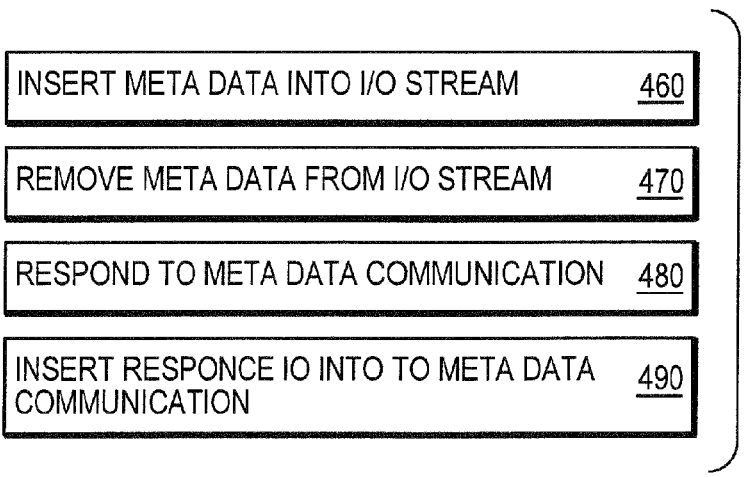
FIG. 4c illustrates a further alternative embodiment of a method of the present invention.

Further, refer also to the embodiment of FIG. 4b. In some embodiments, the host 310 may alter 450 its behavior based on the meta data. Refer now to FIG. 3 and FIG. 4c. In some embodiments, the host 310 may respond 480 to the meta data by inserting 490 meta data back into the IO stream 365. In other embodiments, the storage device 360 may respond 480 to the meta data by inserting 490 other meta data into the IO stream 365.

Figure 5:
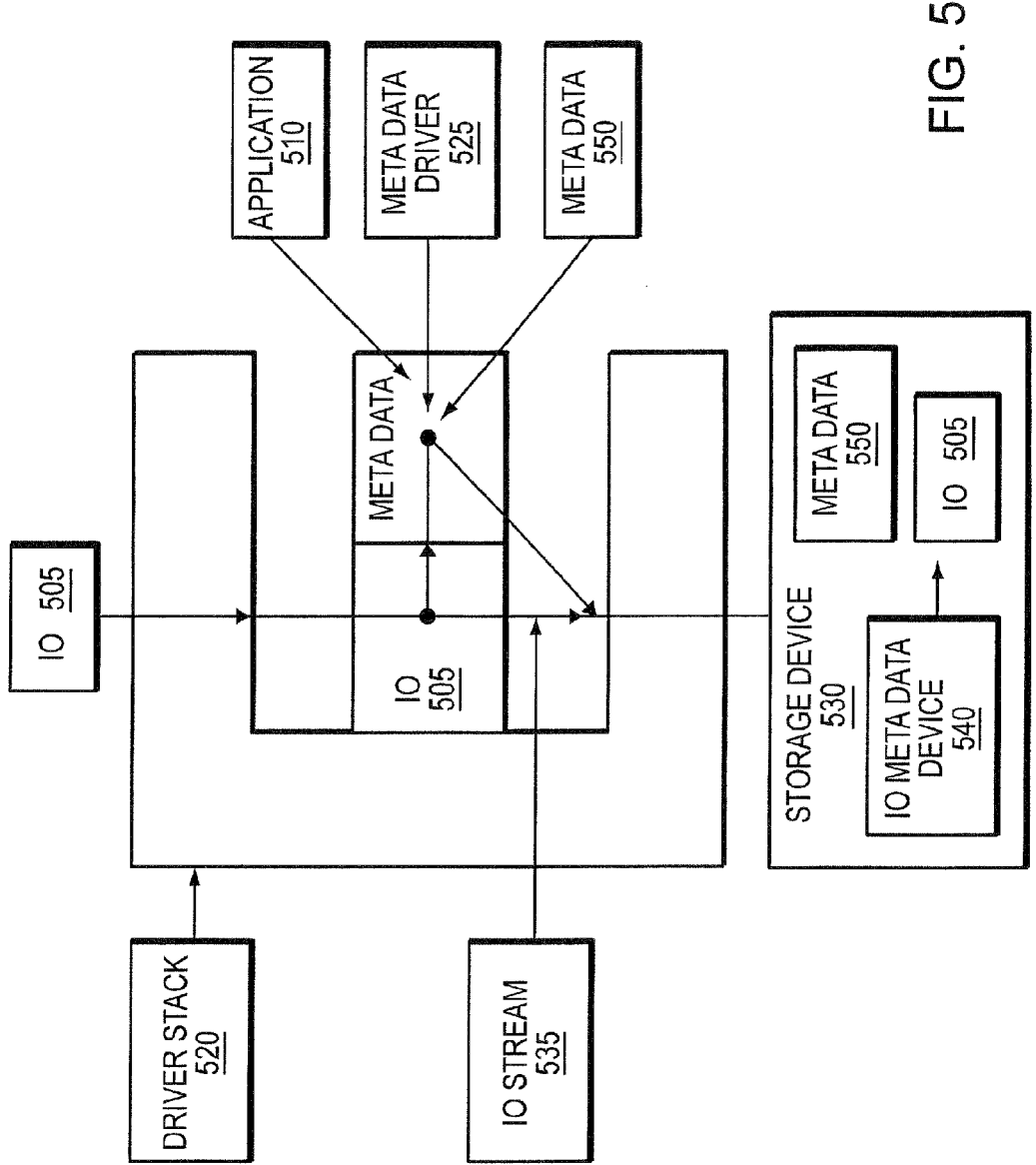
FIG. 5 illustrates an embodiment of the current invention of a driver stack using the C-Clamp architecture.
Figure 6:
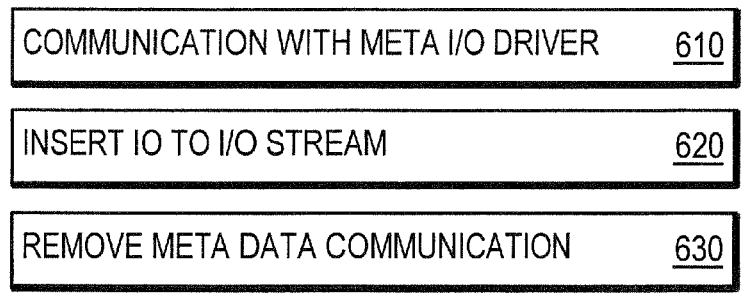
FIG. 6 illustrates an embodiment of a method of the present invention.

Refer to the embodiments of FIGS. 5 and 6. In the embodiment of FIG. 5, the driver stack 520 is shown using the C-Clamp architecture. As well, an application 510 is shown. The application 510 may communicate 610 with the meta data driver 525 requesting that the meta data driver 525 send a specific communication, meta data 550, to the storage device 530. The meta data driver 525 may insert 620 meta data IO 550 into the IO stream. The storage device 530, via I/O meta data device 540, may remove 630 meta data 550 from the I/O stream 535.

In an embodiment of the current invention, the storage device may apply predictive data request or trend data to the data requests to allow the application to intelligently alter its data requests. A host may have read and write queues with respect to connected data storage devices. That is, the host may only submit X read requests or Y write requests to a particular data storage device at one time. The host may do this in order to pace or not overstress the storage device. This configuration has typically been set by the system admin of the host/server platform. Conventionally, the data storage device is not able to change the values of these queues or wait times on the host. Typically, the only way the data storage device can change the host request is to slow how quickly the data storage device responds to the host requests.

By allowing the array to instruct the host to make its queues deeper, it may enable the host to request and attain better performance. Conversely, by telling the host that an impending operation is going to cause the storage device to delay its responses, the host operating system may temporarily extend its I/O wait time to accommodate the storage. In some embodiments, this may be particularly useful if the storage needed to execute a brief outage for part repair.

Figure 7:
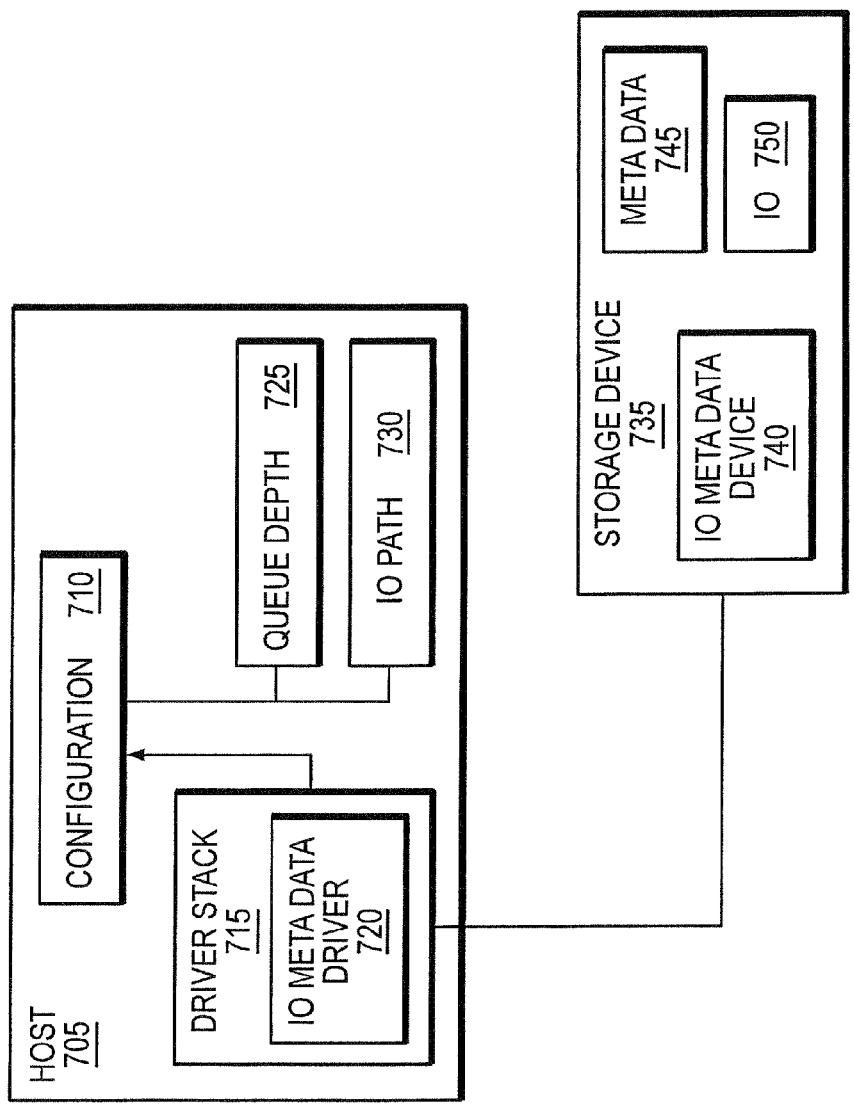
FIG. 7 illustrates an embodiment of the current invention where data storage device may monitor the I/O requests being received from the host.
Figure 8:
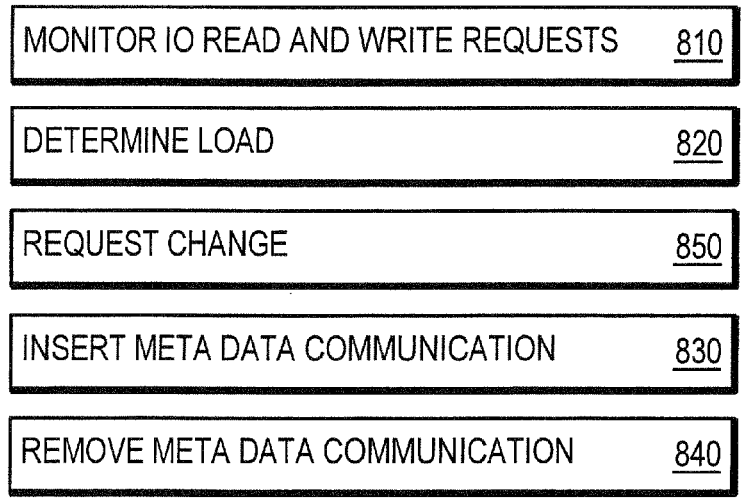
FIG. 8 illustrates an alternative embodiment of a method of the present invention.

Refer now to the embodiment of FIGS. 7 and 8. In an embodiment, the data storage device 735 may monitor 810 the I/O requests being received from the host 705. The data storage device 735 may be able to determine 820 if it can handle more requests or if it there are too many requests from the host 705. Based on the load on the storage device 735, the storage device 735 may insert 830 meta data 745 to be communicated to the host 705 requesting a change in the host configuration 710. A change may be that the host 705 should send more requests to the data storage device. An example of this may be that the data storage device can service more host requests. Another example of this may be that the data storage device is waiting to respond to the host until more storage requests arrive. The storage device 735 may request 825 a change in the configuration 710 such as changing queue depth 725 or changing IO path 730.

In an alternative embodiment, the data storage device could request that the host send fewer requests to the data storage device. The data storage device may need more time to process incoming requests and may inform the host of this request. In further embodiments, the storage device may continually monitor its activity and adjust the configuration on the host to match the storage device's current and predicted level of activity. In further embodiments, the storage device may request that the IO queue depths be changed on the host. In alternative embodiments, any host configurable setting may be changed by the storage device to enable more efficient data transfer operations.

In an alternative embodiment, the storage device may tell the host to flush or mark as obsolete specified data from cache, because the data has been modified by another host. This may enable a server to be more efficient and may also enable storage clustering, with a timely updates to the hosts.

In other embodiments, the storage may tell the host that it has decided to buffer certain LBAs (logical block addresses) in its high-speed cache, and as a result the host embodiment may release those blocks from its own cache to free up space for other operations. In further embodiments, the host may tell the storage that it is going to keep certain data in its local cache and the storage may release those LBAs and re-use the memory. In further embodiments, an array may tell the host to look for and begin using another path to a LUN over the SAN, which may also change the "data configuration settings", since the target identifiers are typically data configurations on the host/server.

Typically, data storage devices may be comprised of different types of storage mediums. These mediums may have different access speeds, availability profiles and costs. For example, a storage device may manage many disks and there may be different types of disks. The disks or storage mediums may be grouped into Tiers based on the performance characteristics of the disks. A group of fast but small disks may be a fast Tier. As well, a group of solid state drives could be another fast Tier. A group of slow but large disks may be a slow Tier. It may be possible to have other Tiers with other properties or constructed from a mix of other disks to achieve a performance or price goal. Tiers may also be "characteristics" instead of disk types—i.e. there may be a "compressed" tier on SATA, or a "de-duplicated" backup or archive tier. Typically, the more expensive the storage tier, the more the storage tier costs, which may result in a cost/performance tradeoff.

In some embodiments, the meta data driver may request that the storage keep certain data available for quick access. In some embodiments, if the host is running a database, it may be beneficial to keep the indices or a specific subset of the index tables of the database readily accessible at all times. Previously, storage devices may have only kept the most recently accessed or most frequently used data available at a high or quickly accessible storage tier. This may have resulted in a request for newly accessed index blocks of a database being slow, as the index data may have been on a lower tier of storage and needs to be transferred from a lower to a faster storage tier.

In an embodiment, the application may request that the storage device keep the indices, or specific block/LBA ranges of the database in the storage devices' cache, in flash storage, or in other quickly accessible storage. This may ensure that a requested indexes or data is always quickly accessible. In some embodiments, the host may request that that certain other blocks of data, be kept in slower storage. This may occur given the case the application or database may know that the data is unlikely to be accessed by the host in the near term, but quick access to the index may be beneficial in satisfying the application request, such as a database lookup. In this embodiment, the database, application or file system may also tell the storage not to bother keeping certain blocks on fast media because it may have decided to maintain a copy in its own local cache.

Figure 9:
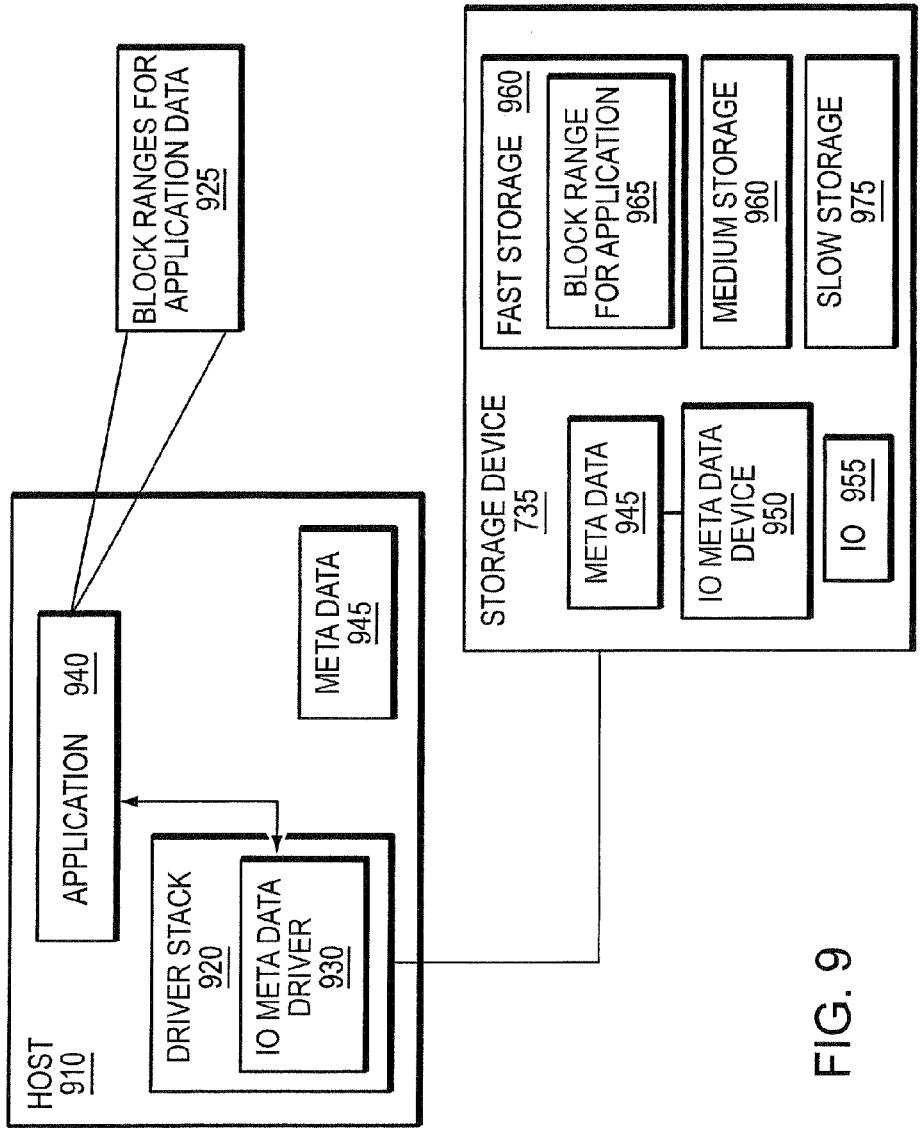
FIG. 9 illustrates an embodiment of the current invention where host may request the data storage device keep block ranges in fast storage.
Figure 10:
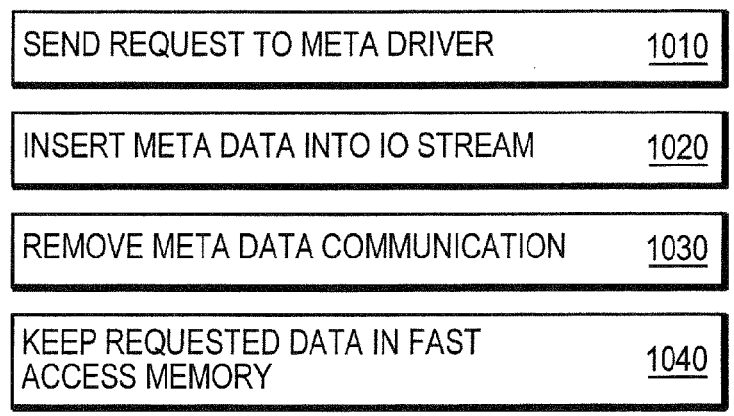
FIG. 10 illustrates an alternative embodiment of a method of the present invention.

For example, refer to the embodiments of FIGS. 9 and 10. Application 940 may send 1010 a request to host meta data driver 930 to keep a range of storage blocks 965 in fast access storage 960. In an embodiment, assume that application 940 is a database application. The database may have allocated indices 1-10,000. It may be beneficial for these indices of the database to always be accessible quickly. In an example embodiment, the indices 1-10,000, may correspond to LUN blocks 30,000-40,000 925. The meta data driver 930 may insert meta data 945 requesting that these LUN blocks 965 be kept in highly accessible storage, such as Fast Storage 960. The storage device 940 may remove the request, for example by removing meta data 945. The storage device 940 may keep 1040 the requested data 925, LUN blocks 30,000-40,000 965, in highly accessible storage, such as 960, based on the host 910 request.

In an alternative embodiment, the storage device may determine that currently only indices 1-5,000 or blocks 30,000-35,000 are being accessed by the application. In this embodiment, the storage device may insert metadata into the IO stream to request that that it maintain the portion of the data corresponding to blocks 30,000-35,000 in highly accessible storage. In certain embodiments, the application may respond to this type of request by determining that only indices 1-5,000 are being used and allow the storage device to only keep these indices in highly available storage. In other embodiments, the application may modify the request to some other number of storage blocks. In further embodiments, the application may deny the request.

In an alternative embodiment, the communication may be used for security to ensure that the requestor of data from the data storage has permission to access the data. In certain embodiments, the storage device may associate a security descriptor with access to certain ranges of LUN blocks. This security descriptor may be stored in meta data on the storage device. When the host requests access to the storage device, the host may pass a security descriptor to the storage device, via the meta data driver. The storage device may remove the security descriptor to determine whether or not to grant access. Based on the decision to grant access, the storage device may return the data requested or deny the request. In alternative embodiments, there may a particular security descriptor for each user that requests data.

In another embodiment, the storage array and the host may establish "trust" between them by exchanging meta-data and "secrets." Once "trust" is established, the host may pass the user's credentials on each LBA I/O request to the storage, and the storage may validate those credentials and only return the data if the credentials matched a "rights" definition for this user. This embodiment may use the block storage I/O channel as the vehicle for establishing trust and for accepting/rejecting I/O requests based on the end-user identity.

Figure 11:
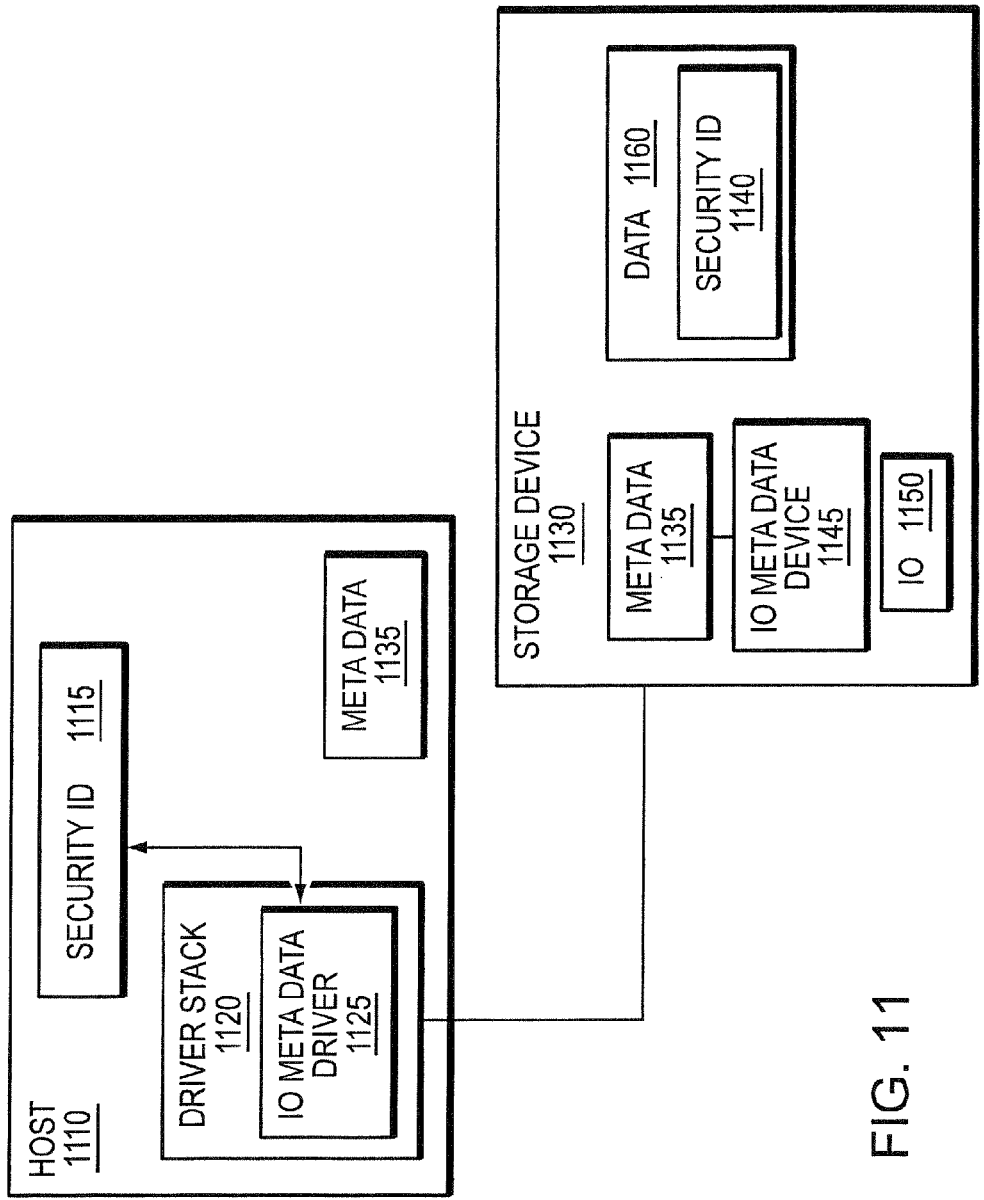
FIG. 11 illustrates an embodiment of the current invention where host may send a security ID to the data storage device.
Figure 12:
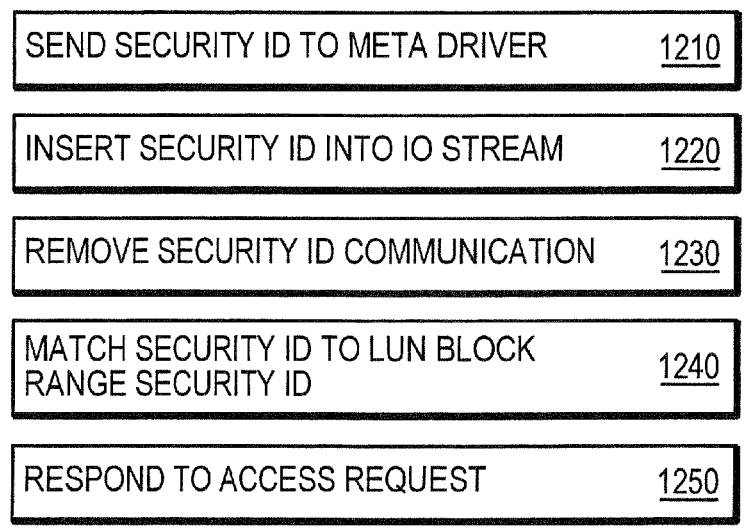
FIG. 12 illustrates an alternative embodiment of a method of the present invention.

For example, refer to the embodiments of FIGS. 11 and 12. Host 1110 may request data 1160 from the storage device 1130. Data 1160 on storage device 1130 may be associated with a security ID 1140. When host 1110 requests access to data 1160, host 1110 may include security descriptor 1115 in meta data 1135 when requesting the data 1160. Storage device 1130 may, via i/O meta data device 1145, may remove the security descriptor indicating the security ID 1115. The storage device 1130 may compare the security if 1115 the host 1110 put in the meta data 1135 to the security descriptor 1140 associated with data 1160. Based on the comparison, the storage device 1130 may decide to grant access to data 1160.

In further embodiments, each user may pass a security id to the host when requesting data. The security ID may be shared across a user group or may be specific to each user. The user may have the security ID, or the use may uniquely identify to the host, which may keep a store of the security IDs. The security ID may be passed to the host to identify the user in a determination as to whether or not to grant access to the data.

In yet other embodiments of the current invention, the communication may be used to replace the storage device with another storage device transparent to the hosts and the application requesting the data. In certain embodiments, it may be beneficial to swap one storage device with another storage device. Typically, this change would require that access to one storage device be shutdown at the application level, the storage devices be switched, then the access may be restored. This may occur because of the limitation of how storage devices are implemented on the system. That is, the host may identify a storage device with a particular ID number such as a World-Wide Name or other UID number (UID=Unique Identifier). It may direct all read write IO to that particular target ID for a particular application or set of applications.

Figure 13:
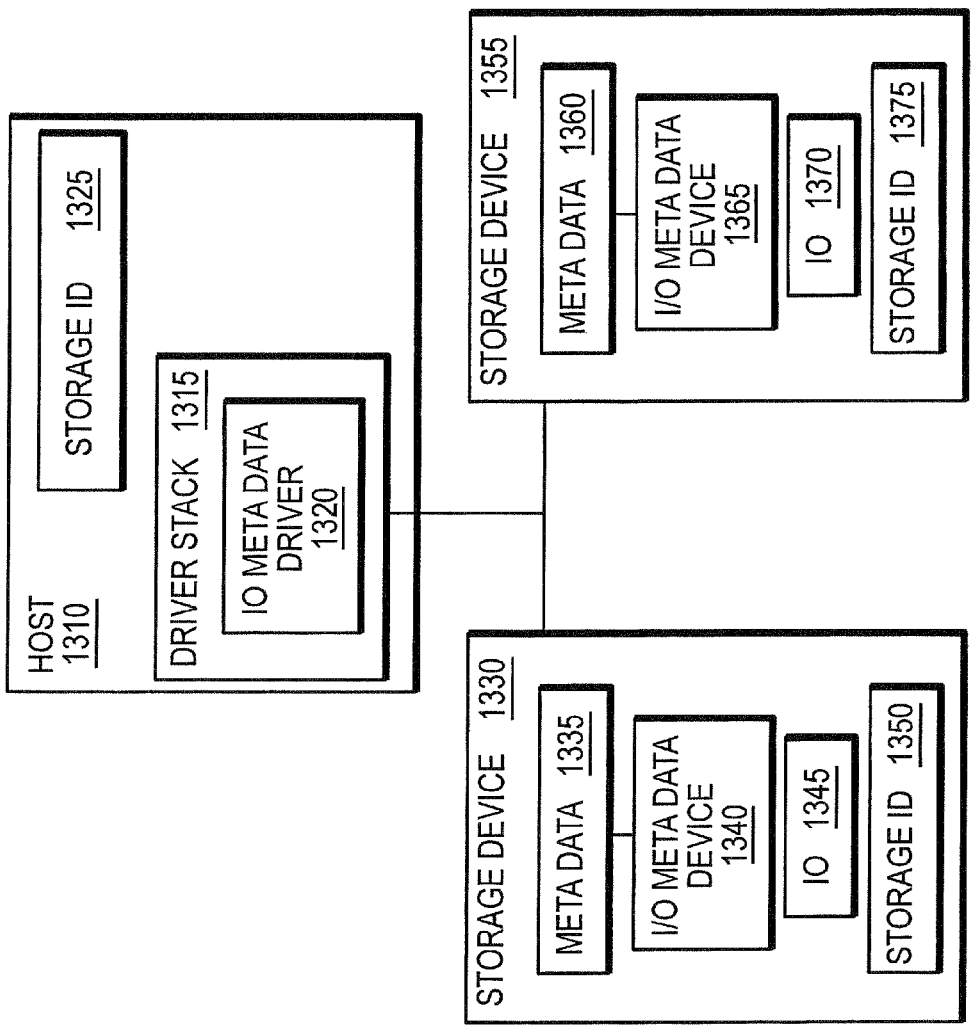
FIG. 13 illustrates an embodiment of the current invention where host may be migrated from one data storage device to another data storage device.
Figure 14:
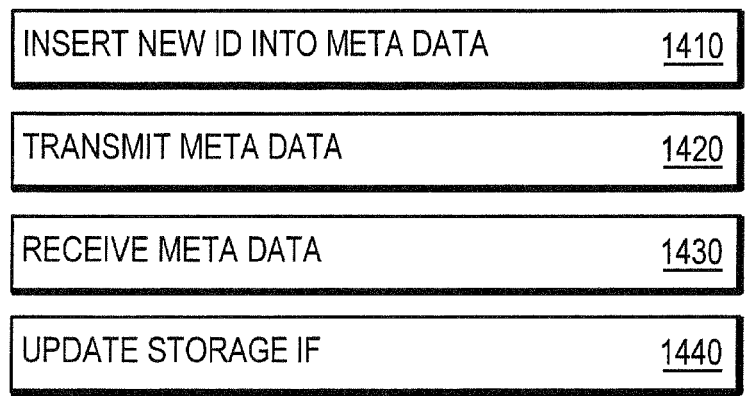
FIG. 14 illustrates an alternative embodiment of a method of the present invention.

Refer to the embodiments of FIGS. 13 and 14. In an embodiment of the current invention, the swapping of a storage device, such as storage devices 1330 and 1355, may be handled in the driver stack 1315 transparent to the host 1310 and, in alternative embodiments, transparent to the operating system. In an embodiment, the storage device 1330 may communicate with the host driver 1320 that it should now communicate with a new storage device 1350 for all storage requests. In an embodiment, the storage device 1330 may insert 1410, the new id into some meta data. The storage device 1330 may transmit 1420 the meta data via the I/O Meta data driver 1340. The host 1310 IO meta data driver 1320 may receive 1430 the meta data 1335. The host 1310 I/O meta data driver 1320 may update 1440 the storage ID 1325.

Before this switch occurs, the storage device 1330 may have mirrored all data from to the new storage device 1350 to allow a seamless transition from one storage device to another. This may allow storage devices to be changed without having to pause either the host or the application communication. In certain embodiments, this may be accomplished by swapping the Storage ID 1325 on the host 1310 with the value of the storage id 1375 for the new storage device 1355 for the storage ID 1350 of the old storage device 1330.

In an alternative embodiment, the storage device may be involved in an active migration. That is, the storage device may tell the host driver that a set of LUN blocks may not be accessed from a new storage device and that all requests for these blocks should be directed to a new storage device. As the storage device migrates data to the new storage device, the host driver may be updated as to what blocks may be accessed via the new storage device until all blocks may be accessed via the new storage device. Once migration is complete and the host has transitioned to the new storage device, the old storage device may be shutdown or removed from the network.

In another embodiment of the current invention, the host may ask the storage to effect a specific action on its behalf. For example, Block Range 1000-25000 may be copied into block addresses starting at 276,000 creating an identical copy of these ranges. This embodiment may seek to leverage the performance and locality of data within the array to effect bulk data copies.

Figure 15:
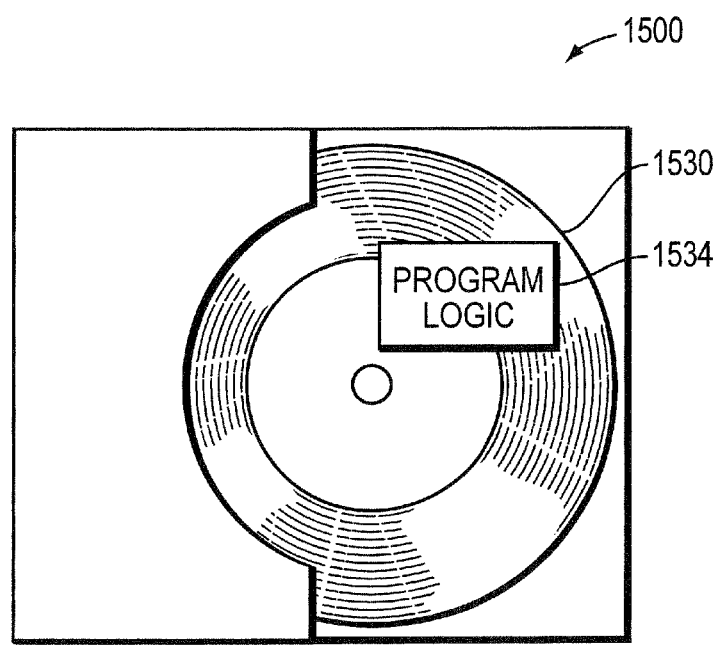
FIG. 15 illustrates embodiment of the current invention in program code.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 15 shows Program Logic 1534 embodied on a computer-readable medium 1530 as shown, and wherein the Logic is encoded in computer-executable code configured for carrying out the reservation service process of this invention and thereby forming a Computer Program Product 1500.

The logic for carrying out the method may be embodied as part of the system described below, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method to enable a storage device, comprising a storage device meta data device and a set of non-transitory storage mediums, to communicate with a host comprising a host meta data device, the method comprising:
    inserting meta data at the host into an I/O stream communicated between the host and the storage device;
    receiving I/O of the I/O stream at the storage device; and
    removing meta data inserted into the I/O stream communicated between the host and the storage device by the storage device meta data device located on the storage device; wherein the meta data contains communications between the storage device and the host; wherein the meta data relates to a future access pattern of the data on the storage device;

wherein at least one of the set of storage mediums is allocated to a storage tier;

wherein the host meta data device injects meta data corresponding to a request for allocation of a range of storage blocks to a specified storage tier; and wherein the storage device meta data device responds to the meta data by moving the range of storage blocks to a storage medium of the set of storage mediums allocated to the specified storage tier as requested by the host meta data device.

2. The method of claim 1 wherein the host meta data device is a host side driver inserted into the host IO driver stack.

3. The method of claim 2 wherein the storage device is configured to insert meta data into the I/O stream, wherein the meta data corresponds to a request to change to the World Wide Name/User ID (WWN/UID) descriptor on the host corresponding to the storage device to enable the storage device to be relocated to another logical storage device transparent to host applications.

4. A system comprising:

a host comprising a host meta data device to inject and remove I/O meta data from the IO stream between the host and storage device;

a storage device comprising a set of non-transitory storage mediums and a storage device meta data device to inject and remove meta data I/O into the IO stream between the host and the storage device; and computer-executable program code operating in memory, wherein the computer-executable program code is configured for execution of the following steps:

inserting meta data, at the host, into an I/O stream communicated between the host and the storage device;

receiving I/O of the I/O stream at the storage device; and removing meta data inserted into the I/O stream communicated between the host and the storage device by the storage device meta data device located on the storage device; wherein the meta data contains communications between the storage device and the host;

wherein the meta data relates to a future access pattern of the data on the storage device;

wherein at least one of the set of storage mediums is allocated to a storage tier;

wherein the host meta data device injects meta data corresponding to a request for allocation of a range of storage blocks to a specified storage tier; and wherein the storage device meta data device responds to the meta data by moving the range of storage blocks to a storage medium of the set of storage mediums allocated to the specified storage tier as requested by the host meta data device.

5. The system of claim 4 wherein the host meta data device is a host side driver inserted into the host IO driver stack.

6. The system of claim 5 wherein the storage device is configured to insert meta data into the I/O stream, wherein the meta data corresponds to a request to change to the WWN/UID descriptor on the host corresponding to the storage device to enable the storage device to be relocated to another logical storage device transparent to host applications.

7. A program product to enable a storage device, comprising a storage device meta data device and a set of non-transitory storage mediums, to communicate with a host comprising a host meta data device, the program product comprising:

a non-transitory computer-readable storage medium encoded with computer-executable program code enabling:

inserting meta data, at the host, into an I/O stream communicated between the host and the storage device;

receiving I/O of the I/O at the storage device; and removing meta data inserted into the I/O stream communicated between the host and the storage device by the storage device meta data device located on the storage device; wherein the meta data contains communications between the storage device and the host; wherein the meta data relates to a future access pattern of the data on the storage device;

wherein at least of the set of storage mediums is allocated to a storage tier;

wherein the host meta data device injects meta data corresponding to a request for allocation of a range of storage blocks to a specified storage tier; and wherein the storage device meta data device responds to the meta data by moving the range of storage blocks to a storage medium of the set of storage mediums allocated to the specified storage tier as requested by the host meta data device.

8. The computer program product of claim 7 wherein the storage device is configured to insert meta data into the I/O stream, wherein the meta data corresponds to a request to change to the WWN/UID descriptor on the host corresponding to the storage device to enable the storage device to relocated to another logical storage device transparent to host applications.

9. The method of claim 1 wherein the host meta data device is an embedded function within the host cache management subsystem.

10. The method of claim 1 wherein the host meta data device is a hypervisor.

11. The method of claim 2 wherein the meta data is used to reserve block data on the storage device in fast storage to enable efficient application reads.

12. The method of claim 11 wherein the block of data reserved corresponds to the indices of a database application.

13. The method of claim 2 wherein the meta data is used to identify that upcoming I/O requests from a block range is for backup operations to enable data the data not to be migrated to a higher tier of storage.

14. The method of claim 2 wherein the meta data is used to notify the storage whether to track I/O statistics for a specific range of LBAs utilized by the storage device to determine relocation of specific block ranges to different tiers.

15. The system of claim 4 wherein the host meta data device is a hypervisor.

16. The system of claim 4 wherein the meta data is used to reserve block data on the storage device in fast storage to enable efficient application reads.

17. The method of claim 16 wherein the block of data reserved corresponds to the indices of a database application.

18. The system of claim 4 wherein the meta data is used to identify that upcoming I/O requests from a block range is for backup operations to enable data the data not to be migrated to a higher tier of storage.

19. The system of claim 4 wherein the meta data is used to notify the storage whether to track I/O statistics for a specific range of LBAs utilized by the storage device to determine relocation of specific block ranges to different tiers.

20. The computer program product of claim 7 wherein the host meta data device is a hypervisor.

21. The computer program product of claim 7 wherein the meta data is used to reserve block data on the storage device in fast storage to enable efficient application reads.

22. The computer program product of claim 21 wherein the block of data reserved corresponds to the indices of a database application.

23. The computer program product of claim 7 wherein the meta data is used to identify that upcoming I/O requests from a block range is for backup operations to enable data the data not to be migrated to a higher tier of storage.

\* \* \* \* \*